United States Patent
Lutz et al.

(10) Patent No.: US 11,558,203 B2
(45) Date of Patent: Jan. 17, 2023

(54) AUTOMATED PUBLIC KEY INFRASTRUCTURE INITIALIZATION

(71) Applicant: Siemens Aktiengesellschaft, Munich (DE)

(72) Inventors: Benjamin Lutz, Pfinztal (DE); Anna Palmin, Karlsruhe (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 177 days.

(21) Appl. No.: 16/522,906

(22) Filed: Jul. 26, 2019

(65) Prior Publication Data
US 2020/0044869 A1 Feb. 6, 2020

(30) Foreign Application Priority Data
Aug. 2, 2018 (EP) .................................... 18187021

(51) Int. Cl.
*H04L 9/32* (2006.01)

(52) U.S. Cl.
CPC .......... *H04L 9/3268* (2013.01); *H04L 9/3213* (2013.01); *H04L 9/3265* (2013.01)

(58) Field of Classification Search
CPC ... H04L 9/3265; H04L 9/3268; H04L 9/3213; G06F 21/33; G05B 19/406
See application file for complete search history.

(56) References Cited

U.S. PATENT DOCUMENTS

| | | | |
|---|---|---|---|
| 7,069,451 B1* | 6/2006 | Ginter | G06F 21/10 348/E5.006 |
| 9,386,101 B2 | 7/2016 | Kawamoto et al. | |
| 2009/0327696 A1* | 12/2009 | Hatlelid | H04L 9/3265 713/151 |
| 2011/0154026 A1* | 6/2011 | Edstrom | H04L 63/0823 713/158 |
| 2012/0166796 A1* | 6/2012 | Metke | H04L 9/3263 713/158 |
| 2014/0289511 A1* | 9/2014 | Tuch | G06F 21/6281 713/156 |
| 2015/0215338 A1 | 7/2015 | Haridas et al. | |
| 2016/0191253 A1* | 6/2016 | Pyle | H04L 9/3263 380/28 |
| 2016/0211978 A1 | 7/2016 | Bowen | |
| 2018/0004949 A1 | 1/2018 | Lutz et al. | |

(Continued)

FOREIGN PATENT DOCUMENTS

| | | |
|---|---|---|
| CN | 108880788 | 11/2018 |
| EP | 3264208 | 1/2018 |

(Continued)

*Primary Examiner* — Mohammad A Siddiqi
(74) *Attorney, Agent, or Firm* — Cozen O'Connor

(57) ABSTRACT

An operator station server of a technical installation upon which a certification service is implemented, wherein the certification service is configured to receive configuration information, which depends on a role of the operator station server in the technical installation, from at least one of (i) an engineering station server and (ii) a registration service of the technical installation, where the configuration information comprises information identifying which certificates of the certification service of the operator station server must be requested from a certification authority of the technical installation.

9 Claims, 4 Drawing Sheets

(56) References Cited

U.S. PATENT DOCUMENTS

| | | | |
|---|---|---|---|
| 2018/0004953 A1* | 1/2018 | Smith, II | ............... G06F 21/78 |
| 2018/0322274 A1 | 11/2018 | Lutz et al. | |
| 2019/0087598 A1* | 3/2019 | Adkins | ............... G06F 21/121 |
| 2019/0349426 A1* | 11/2019 | Smith | ..................... H04L 45/20 |
| 2020/0028696 A1* | 1/2020 | Malluru | ................. G06F 21/33 |

FOREIGN PATENT DOCUMENTS

| | | |
|---|---|---|
| EP | 3402152 | 11/2018 |
| JP | 2002-215826 | 8/2002 |
| JP | 2004-179724 | 6/2004 |
| JP | 2007-143126 | 6/2007 |
| JP | 2011-041080 | 2/2011 |
| JP | 2011-154410 | 8/2011 |
| JP | 2012-249124 | 12/2012 |
| JP | 2017-506473 | 3/2017 |
| JP | 2017-511024 | 4/2017 |

\* cited by examiner

AUTOMATED PUBLIC KEY INFRASTRUCTURE INITIALIZATION

BACKGROUND OF THE INVENTION

1. Field of the Invention

The invention relates to a technical installation, in particular production or process installation, an operator station server of the technical installation and to a method for initializing a server formed as an operator station in the technical installation which includes at least one server formed as an engineering station and at least one certification authority for issuing certificates.

2. Description of the Related Art

In accordance with the role of an operator station server (OS server) of a technical installation, a large number of certificates are required for operation. These include, for example, the following certificates: (i) Open Platform Communications Unified Architecture (OPC UA) certificates for communication with a third-party system via an OPC UA connection, (iii) Transport Layer Security (TLS) certificates for operator control and monitoring via a web connection, (iii) further certificates, e.g., for the encrypted communication of the operator station server in a network (in the case of distributed process images).

The role is not clear during/after the installation of an operator station server, because this is project-dependent. Furthermore, the role can change during a lifecycle of the operator station server. This also applies to the certificates required for performing the role.

In addition to the certificates for the respective operator station server itself, the data (described in the RFC5280 standard as "trust chains") that the operator station server (OS server) requires to validate the certificates of its communication partners is also to be stored thereon. For example, this data comprises the following certificates for a certificate cert(OS1) issued for the OS server OS1: cert (Issuing CA1), cert(Intermediate CA1), cert(Intermediate CA1(i)), cert(Root_CA).

In this context "Issuing CA1" is what is known as the "Issuing Certification Authority" that issued the certificate cert(OS1). Intermediate CA1(1) is what is known as the "Intermediate Certification Authority" that issued the certificate cert(Issuing CA1) or in other words signed the "Issuing CA1".

Intermediate CA1(i) for 2<i <n is for an integer n (>2) what is known as the "Intermediate Certification Authority" that issued the certificate cert(CA1(i−1)) or in other words signed the "Intermediate CA1(i−1)". "Intermediate CA1(n) =Root_CA1" is the trusted root CA that issued the certificate cert(Intermediate CA1(n−1)) or in other words signed the "Intermediate CA1(n−1)".

The certification authority must be stored securely, be offline, and may/should be activated only for the purpose of issuing certificates for other lower-level certification authorities.

A mutual validation of certificates is a standard part of communication using protocols for secure communication. For example, the first step in a TLS-protected communication is represented by what is known as the TLS handshake, in which the communication partners validate each other's certificates. Only after the certificates have been validated successfully does the actual TLS-protected communication occur.

FIG. 1 illustrates how the certificates and trust chains required for secure communication between a first OS server 1 and a second OS server 2 are distributed manually in accordance with the prior art between the two communication partners 1, 2. An authorized user can request this data from a corresponding certification authority (not shown here) and imported (e.g., in the form of a pem file).

To emphasize that these are dedicated certificates for a dedicated purpose, the certificates 3, 4 issued for the participating OS servers 1, 2 are referred to as cert(OS1Enc) and cert(OS2Enc). In this context, the protocol referred to by way of example as "Enc" is a dedicated protocol for secure communication.

This particularly means that the two OS servers 1, 2 require further certificates for further secure applications they wish to use, together with the trust chains of their communication partners.

FIG. 1 illustrates the certificate-based workflow of an initial authentication between the two OS servers 1, 2. In a first step, the OS server 1 sends its certificate 3 (cert(OS1 Enc)) intended for the use of the secure protocol (referred to here as "Enc") to the OS server 2, which then validates the first OS server 1. In this process, the trust chain supplied in the certificate 3 (cert(OS1Enc)) is compared with the trust chain 5 already stored in the second OS server 2. Only if the comparison was successful will the workflow be continued. The trust chain 5 on the second operator station server 2 comprises the following certificates, the function of which is known per se and therefore is not described here in more detail: Issuing certificate 7, Intermediate certificate 8, and Root certificate 9.

The second OS server 2 then transmits its certificate 4 (cert(OS2Enc)) intended for the use of the secure protocol "Enc" to the first OS server 1, which then validates the second OS server 2 with the aid of a trust chain 6 stored on the first OS server 1. The trust chain 6 on the first operator station server 1 comprises the following certificates, the function of which is known per se and therefore is not described here in more detail: Issuing certificate 10, Intermediate certificate 11, and Root certificate 12.

It is advisable with regard to security (based on what is known as the minimality principle) to assign dedicated certificates for each intended purpose or communication protocol. As a result, the following certificates are installed manually on the OS servers 1, 2 which respectively use three different secure protocols for communication with three different partners: three certificates for the OS servers 1, 2 themselves for the three different intended purposes, at least two CA certificates (i.e. at least the certificate of the issuing CA and the certificate of the higher-level root CA) per communication partner, i.e., at least 6 certificates of the relevant certification authorities.

Currently, therefore, during the installation of an operator station server, all possibly required certificates of the OS server itself as well as all CA certificates forming part of the trust chains of its communication partners are also manually installed and/or successively added manually over the lifecycle. As a result, the OS servers generally have a large number of certificates, some of which they may not need.

This creates many disadvantages. These include in particular the following disadvantages, which can impair an availability of the technical installation:

In a first disadvantage, if all certificates stored on an OS server are monitored with regard to their expiration date using a standard mechanism, then for each certificate that is shortly due to expire, a certificate renewal transaction is triggered that requires a bidirectional communication between the affected OS server and a local registration authority as well as a bidirectional communication between the local registration authority and the responsible certification authority. This transaction is highly communication-intensive overall and should therefore be triggered only for the renewal of those certificates that are actually required.

In a disadvantage, if the certification authority that issued the certificate of an OS server has to be replaced by another certification authority because it has been compromised or because it does not fulfill all the applicable requirements, then the abovementioned certificate must be revoked and replaced by another certificate. The trust chains available to its communication partners with regard to this certificate must also currently be replaced by the renewed certificates via a labor-intensive manual process, where inadvertent or even intentional errors are possible.

SUMMARY OF THE INVENTION

In view of the foregoing, it is an object of the invention to provide a method for initializing a server formed as an operator station in a technical installation, in particular production or process installation, which simplifies and renders more fail-safe an administration of the certificates used in the technical installation.

This and other objects and advantages are achieved in accordance with the invention by a method for initializing a server formed as an operator station in a technical installation, in particular production or process installation, an operator station server of a technical installation, and to a technical installation, in particular production or process installation.

In a method for initializing a server formed as an operator station in a technical installation, the object is achieved in accordance with the invention via the following method steps of:
 a) Establishing a connection from the engineering station server to the operator station server;
 b) Installing a trust chain valid for the engineering station server on the operator station server;
 c) Installing a trust chain valid for the operator station server on the engineering station server;
 d) Transmitting a validation certificate of the engineering station server to the operator station server so that the operator station server can validate the engineering station server via the corresponding trust chain previously installed;
 e) Transmitting of a validation certificate of the operator station server to the engineering station server so that the engineering station server can validate the operator station server via the corresponding trust chain previously installed; and
 f) Transmitting of configuration information from the engineering station server to a certification service implemented on the operator station server, where the configuration information depends on a role of the operator station server in the technical installation and comprises information identifying which certificates of the certification service of the operator station server must be requested from the certification authority of the technical installation.

In the present context, an "operator station server" is understood to mean a server that centrally captures data of an operator control and monitoring system and generally also alarm and measured value archives of a control system of a technical installation, and makes this data available to users. In the present context, a control system is understood to be a computer-aided technical installation, which comprises functionalities for representing, operating and controlling a technical manufacturing or production installation. The control system comprises in the present case sensors for determining measured values, as well as various actuators. Additionally, the control system comprises what are known as process or manufacture-oriented components, which serve to activate the actuators or sensors. Furthermore, the control system has inter alia means for visualizing the technical installation and for engineering. The term control system is additionally intended to also encompass further computer units for more complex regulations and systems for data storage and processing.

The operator station server generally establishes a communication connection to automation systems of the technical installation and forwards data of the technical installation to what are known as clients for the purpose of operating and monitoring the individual function elements of the technical installation. The operator station server can have client functions for accessing the data (archives, messages, tags, variables) of other operator station servers. In this way, images of an operation of the technical installation on the operator station server can be combined with variables of other operator station servers (server-server communication). The operator station server can be a SIMATIC PCS 7 industrial workstation server from SIEMENS, without being restricted to this.

The technical installation can be an installation from the process industry, such as a chemical, pharmaceutical or petrochemical installation, or an installation from the food and beverage industry. This also encompasses any installations from the production industry, factories, in which, for example, automobiles or goods of all kinds are produced. Technical installations that are suitable for implementing the inventive method can also come from the power generation sector. The term "technical installation" also encompasses wind turbines, solar installations or power generation plants.

These installations in each case have a control system or at least a computer-aided module for controlling and regulating the running process or production. Part of the control system or control module or of a technical installation is at least a database or an archive in which historical data is stored.

In the present context, an "engineering station server" is understood to be a server that is configured to generate, administer, archive and document various hardware and software projects (engineering projects) for a process control system of a technical installation. An engineering project is understood in this context to be an automation task for a part of a technical installation (or for the entire installation). Such tasks can comprise the steps "monitor, operate, modify, etc.", for instance. With the aid of special software engineering tools (engineering toolset) as well as modules and plans prepared in advance, an interaction of control devices and facilities of the technical installation can be planned and administered via the engineering station server. An example of this is a SIMATIC manager server from SIEMENS.

In an engineering station server in accordance with the invention, an installed operator station server is added to the hardware configuration of the engineering station server and parameterized following an initial mutual verification. The verification occurs in a manner known per se via what is known as a handshake method. This includes exchanging what are known as trust chains, which are also referred to as "chains of trust" and enable a validation of a device (in this case of a server) via a traceability of the certificates issued for the respective device up to a higher-level root certificate (see also the explanations regarding the prior art).

As a result, the engineering station server can establish a connection to the operator station server in order to define a project assignment for it. Thereafter, this operator station server cannot be used by another engineering station server.

The method in accordance with the invention provides in a particularly advantageous manner for the immediate definition, during the initial engineering of the technical installation, of which certificates (and, where relevant, trust chains) are needed by the operation station server as a function of its role in the technical installation. This information is transmitted to a certification service integrated into the operator station server, which then independently handles the requesting of certificates from a certification authority of the technical installation.

A certificate is understood to be a digital data record, which confirms certain properties (in this case of machines, devices, applications and the like). An authenticity and integrity of the certificate can be verified via cryptographic methods, as a rule.

The certification authority of the technical installation issues the (digital) certificates (provision/assignment) and signs them with its own private key, which it discloses to nobody. The certification authority (CA) forms the core of a public key infrastructure (PKI) of the technical installation.

The inventive method ensures that only those certificates that are actually required for operation are ultimately installed on an operator station server. A certificate renewal can also occur particularly efficiently under the conditions established by the invention. At all times, it is namely triggered only for the certificates that are actually required, thus preventing negative side-effects. It is possible to achieve a significant reduction in the configuration errors associated with certificate management, contributing greatly to problem-free operation of the installation.

In an advantageous embodiment of the invention, at least one registration service of the technical installation is interposed between the certification service of the operator station server and the certification authority.

Conventionally, the automated administration of operational certificates in the context of the installation is realized through the use of a standard protocol, for example, the certificate management protocol (CMP), according to RFC 4210. Here, the devices and applications request the necessary operational certificates situationally from what is known as a local registration authority (LRA).

Here, the devices and applications send a query to the local registration authority, i.e., the certificate signing request (CSR). The local registration authority checks the request by initially reviewing the validity of a signature used to sign the request. Subsequently, the local registration authority checks whether a device certificate, a serial number and optionally further identification features of the devices or the applications is/are stored in what is known as a software inventory of the control system of the technical installation. In the event of a successful check, the request is forwarded to the certification authority (CA), which issues a certificate for the device or the application.

The configuration information transmitted from the engineering station server to a certification service implemented on the operator station server can comprise information indicating from which registration service of the technical installation the certificates must be requested. It must be noted here that various registration services installed in different parts of the installation can forward the certificate requests to a central registration authority (RA), which checks these and forwards them to a certification authority (CA) or to one of several certification authorities.

If an installation is not very large and not too highly segmented, then a single registration service, instead of several registration services and a registration authority, is generally sufficient. This then receives various certificate requests, checks them, and forwards them (if the check has been successful) to the certification authority. For redundancy reasons and topological reasons, several certification authorities can be available in a technical installation, so that the registration service can decide according to certain criteria to which certification authority it will forward the certificate requests.

Particularly preferably, after the initial parameterization of the operation station server, configuration information is transmitted from the engineering station server to the certification service implemented on the operator station server, where the configuration information depends on a role of the operator station server in the technical installation and comprises information identifying which certificates the certification service of the operator station server must remove from the operator station server. Here, the certification service also ensures that the superfluous certificates (and the trust chains) are deleted on the operator station server.

In an advantageous embodiment of the invention, the configuration information transmitted to the certification service implemented on the operator station server is also transmitted by the engineering station server to the at least one registration service of the technical installation. This ensures that, at a later time, the registration service only allows a further, additional operator station server to communicate with the (first) operator station server if these operation station servers are permitted to communicate with one another based on the configuration performed by the engineering station server.

When the additional operator station server establishes a connection to the registration service to integrate itself into the technical installation, the registration service, in place of a certification service of the additional operator station server, can request the required certificates from the certification authority of the technical installation. In other words, if a new operator station server is added, then there is no need for engineering to configure the existing operator station server(s) because the new operator station server registers itself with the existing operator station servers.

It is also an object of the invention to provide an operator station server of a technical installation upon which a certification service is implemented, which is configured to receive configuration information, which depends on a role of the operator station server in the technical installation, from an engineering station server and/or from a registration service of the technical installation, where the configuration information comprises information identifying which certificates of the certification service of the operator station server must be requested from a certification authority of the technical installation.

It is also a further object of the invention to provide a technical installation, in particular production or process installation, having at least one engineering station server, at least one operator station server and at least one certification authority, where the operator station server is configured as explained above.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above-described properties, features and advantages of this invention and the manner in which these are achieved will now be described more clearly and intelligibly in conjunction with the following description of the exemplary embodiment, which will be described in detail making reference to the drawings, in which.

DETAILED DESCRIPTION OF THE EXEMPLARY EMBODIMENTS

Figure 2:
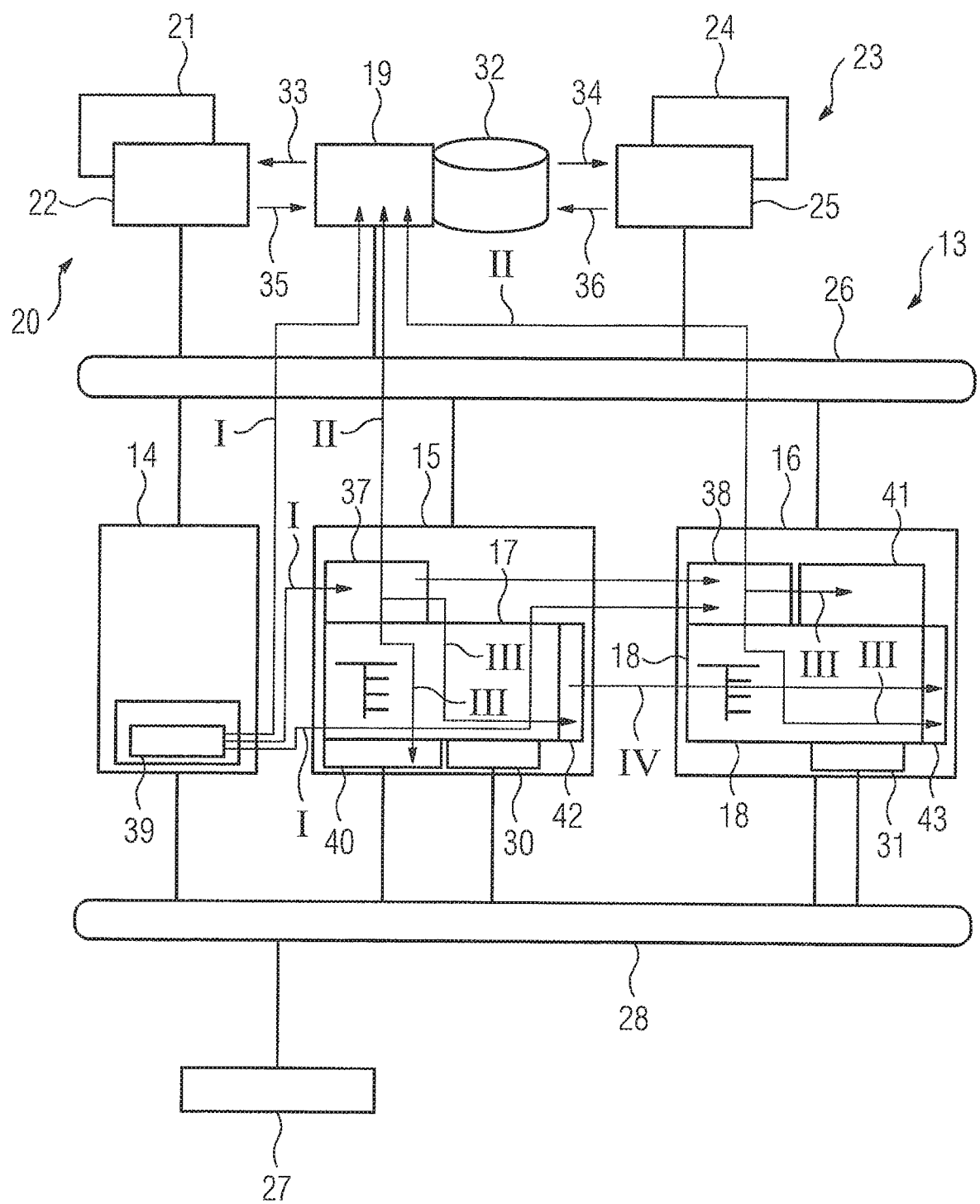
FIG. 2 shows a control system of a technical installation in a schematic diagram in accordance with the invention.

Shown in FIG. 2 is a control system 13 in accordance with the invention of a technical installation formed as a procedural installation. The control system 13 comprises an engineering station server 14, a first operator station server 15 and a second operator station server 16. Each of the two operator station servers 15, 16 has a process data archive 17, 18.

The control system 13 also has a registration service 19 and a first certification authority 20 as well as a second certification authority 23. The first certification authority 20 comprises a root certification authority 21 (root CA) and a certificate issuing authority 22 (issuing CA). The second certification authority 23 also comprises a root certification authority 24 (root CA) and a certificate issuing authority 25 (issuing CA). The registration service 19 has an inventory 32 for storing communication relationships and information about certificates already issued. The registration service 19 requests, in place of the operator station server 15, 16, certificates from one of the two certification authorities 20, 23. To this end, it sends what are known as certificate signing requests 33, 34. In response to these requests (if successful), it receives the requested certificates 35, 36.

The engineering station server 14, the first operator station server 15, the second operator station server 16, the registration service 19 and the first and second certificate authority 20, 23 are connected to one another via a terminal bus 26. A user or client (not shown) can establish a connection to the previously mentioned components via the terminal bus 26. The terminal bus 26 can be formed as an industrial Ethernet for example, without being restricted to this.

A device 27 is connected to both operator station servers 15, 16 and the engineering station server 14 via an installation bus 28. The connected device 27 may alternatively be an application, in particular web application. In the context of the invention, any number of devices and/or applications may be connected. The installation bus 28 can be formed as an industrial Ethernet, for example, without being restricted to this. The device 27 in turn can be connected to any number of subsystems (not shown). For connection to the device 27, the two operator station servers 15, 16 each have suitable drivers 30, 31.

A certification service 37, 38 is implemented on, the function of which is explained in more detail below.

Figure 1:
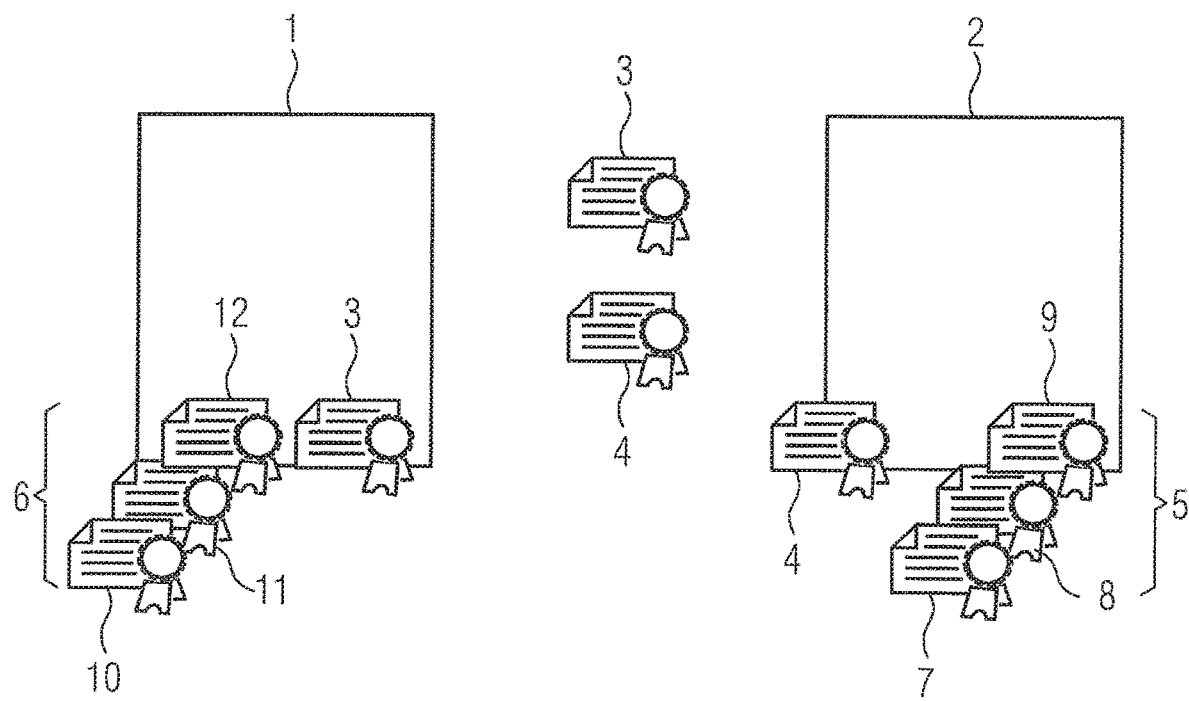
FIG. 1 shows a TLS handshake method in accordance with the prior art.

Following the establishment (explained in FIG. 1) of a secure communication between the engineering station server 14 and the two operator station servers 15, 16, the parameterization of the two operator station servers 15, 16 is performed on the engineering station server 14 in a hardware configuration service 39.

The first operator station server 15 is assigned the domain function or role "OPC Driver" 40 for communication with a dedicated third-party system via OPC and, for this purpose, must obtain the appropriate certificate and the trust chain of the intended communication partner from the registration service 19 specified in the parameterization.

The second operator station server 16 must be able to be operated and monitored via a visualization via an Internet interface and, for this purpose, is assigned the domain function or role "Visualization Service (Web)" 41. Accordingly, for the encrypted communication, it must obtain the appropriate certificate and the trust chain of the intended communication partner from the registration service 19 specified in the parameterization.

In a first step I, the configuration performed in the hardware configuration service 39 of the engineering station server 14 is transmitted to the respective certification service 37, 38 of the two operator station servers 15, 16 and to the registration service 19. In a second step II, each certification service 37, 38 establishes contact with the responsible registration service 19 in accordance with the configuration to obtain the required certificates and the trust chains of the communication partners.

Once the required (and only these) certificates have been obtained in each case, these are transferred in a third step III by the respective certification service 37, 38 of the two operator station servers 15, 16 to the different domain functions 40, 41. Within the same step III, the certificates and trust chains of the deactivated domain functions are also removed (if a domain function is no longer required, for example, as a result of a configuration update, then the respective certificate is also obsolete). The certificate required for this purpose is also transmitted by the registration service 19 in the third step III.

For a networked communication between the individual operator station servers 15, 16, the two operator stations 15, 16 each have a distribution service 42, 43. If, in a fourth step IV, an operator station server 15, 16 now establishes contact with another operator station server 15, 16, then the respective certificate is also transferred to the communication partner by the certification service 37, 38 so that a relationship of trust can be established based on a trust chain before the actual process-related interaction is established between the operator station servers 15, 16 (see also explanations pertaining to FIG. 1).

If required, an additional operator station server can also be integrated dynamically while the technical installation is running. If a new operator station server is added, then the existing operator station servers 15, 16 do not need to be configured by the engineering station server 14 because the new operator station server can register itself with the existing operator station servers 15, 16 (as explained previously). When the new operator station server is added, it registers itself with the registration service 19 via an integrated certification service. The registration service 19, which has at its disposal a trustworthy trust chain for a certificate of the new operator station server, validates the certificate and, in the case of successful validation, adapts the communication relationships stored in the inventory 32 accordingly. The distribution and removal of trust chains then also occurs in accordance with the adapted communication relationships.

The described invention enables the different operator station servers 15, 16 to be configured and to request the certificates required for their role and the trust chains of the communication partners required for secure communication themselves and fully automatically via the registration service 19.

While the registration service 19 forwards each certification request to the certification authority 20, 23 after a comprehensive validation, it is advantageously only able to perform this on request for the trust chain requests. This is because, if it has already obtained a trust chain from a certification authority 20, 23, it has stored this in the inventory 32 and can then make it available after a corresponding check to all trustworthy users that require this trust chain for the certificate validation.

In summary, the invention ensures only those certificates that are actually required for operation are ultimately installed on all operator station 15, 16 servers over the entire lifecycle.

The registration service 19 has connections to the configured certificate issuing authorities 22, 25 (stored in the inventory 32). As a result, the registration service 19 can react immediately if one certificate issuing authority 22, 25 is replaced by another. As a result, all certificates issued by these certificate issuing authorities 22, 25 and the associated trust chains are identified automatically by the registration service 19. The registration service 19 can then trigger a transaction to request new certificates and trust chains from the new certificate issuing authorities 22, 25 and distribute the new certificates and trust chains to the request originators before they have triggered the transaction to revoke and remove the certificates and trust chains that are no longer valid or required.

Figure 3:
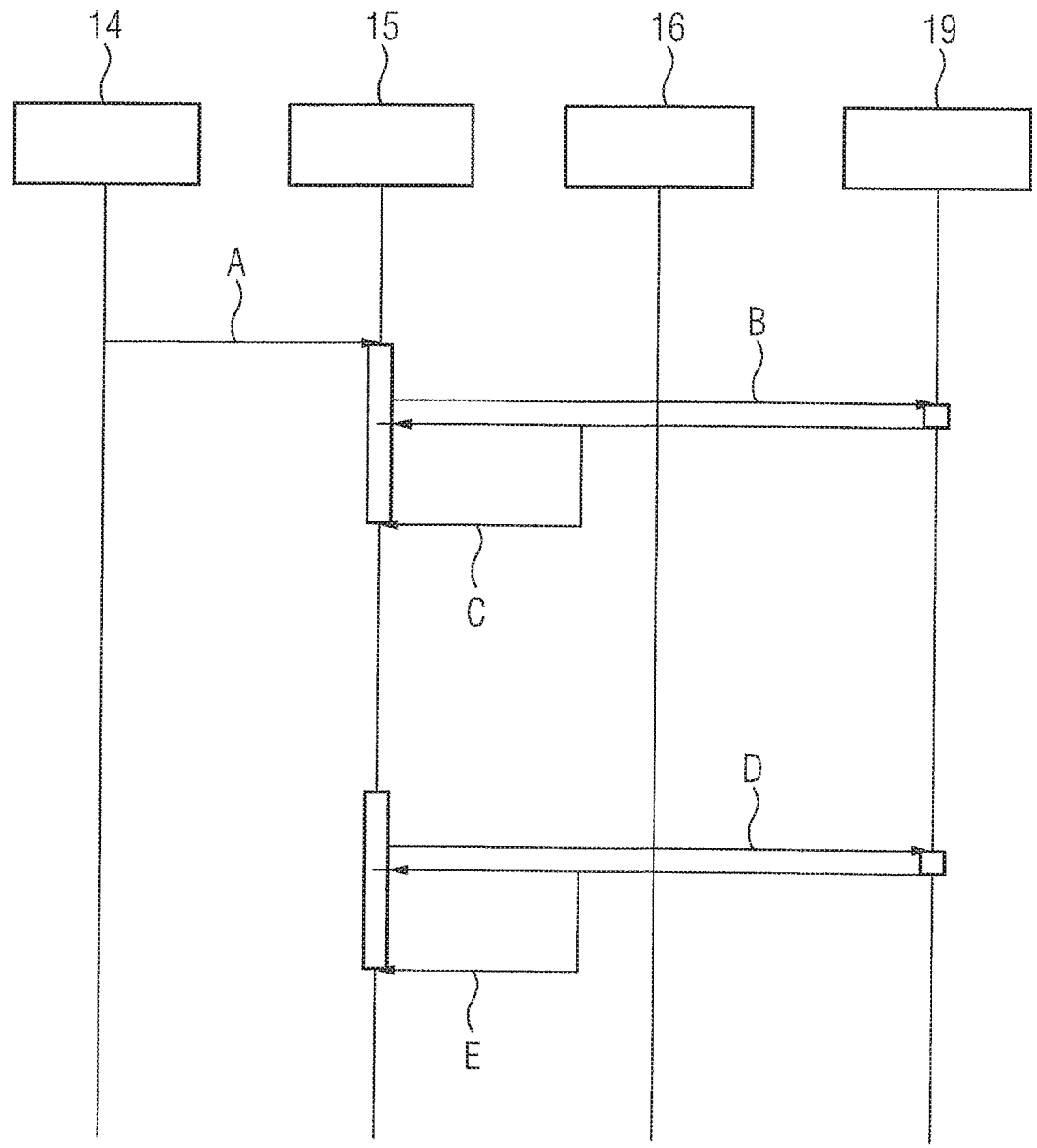
FIG. 3 shows a flow diagram of an initial certificate issue and a certificate renewal in accordance with the invention.

FIG. 3 shows the issue of a certificate, by way of example, as a flow chart. In an initial and first step A, the required configuration information for the first operation station server 15 and the second operator station server 16 is compiled individually by the engineering station server 143 and transmitted to the operator station server 15, 16. In a second step B, the certification service 37, 38 then requests the individually required certificates from the defined registration service 19 on each operator station server 15, 16 and installs these in a third step C.

It must be noted that the registration service 19 forwards the certificate requests after a comprehensive check to a dedicated certification authority 20, 23. The decision regarding to which certification authority 20, 23 a certain certificate request is to be forwarded is taken either by an item of software of the certification authorities 20, 23 or by the responsible user (e.g., LRA super user).

"Certificate maintenance" then begins. In an optional fourth step D, whenever a certificate is about to expire, the certification service 37, 38 requests an updated certificate autonomously from the registration service 19, which is then installed in a fifth step E.

Figure 4:
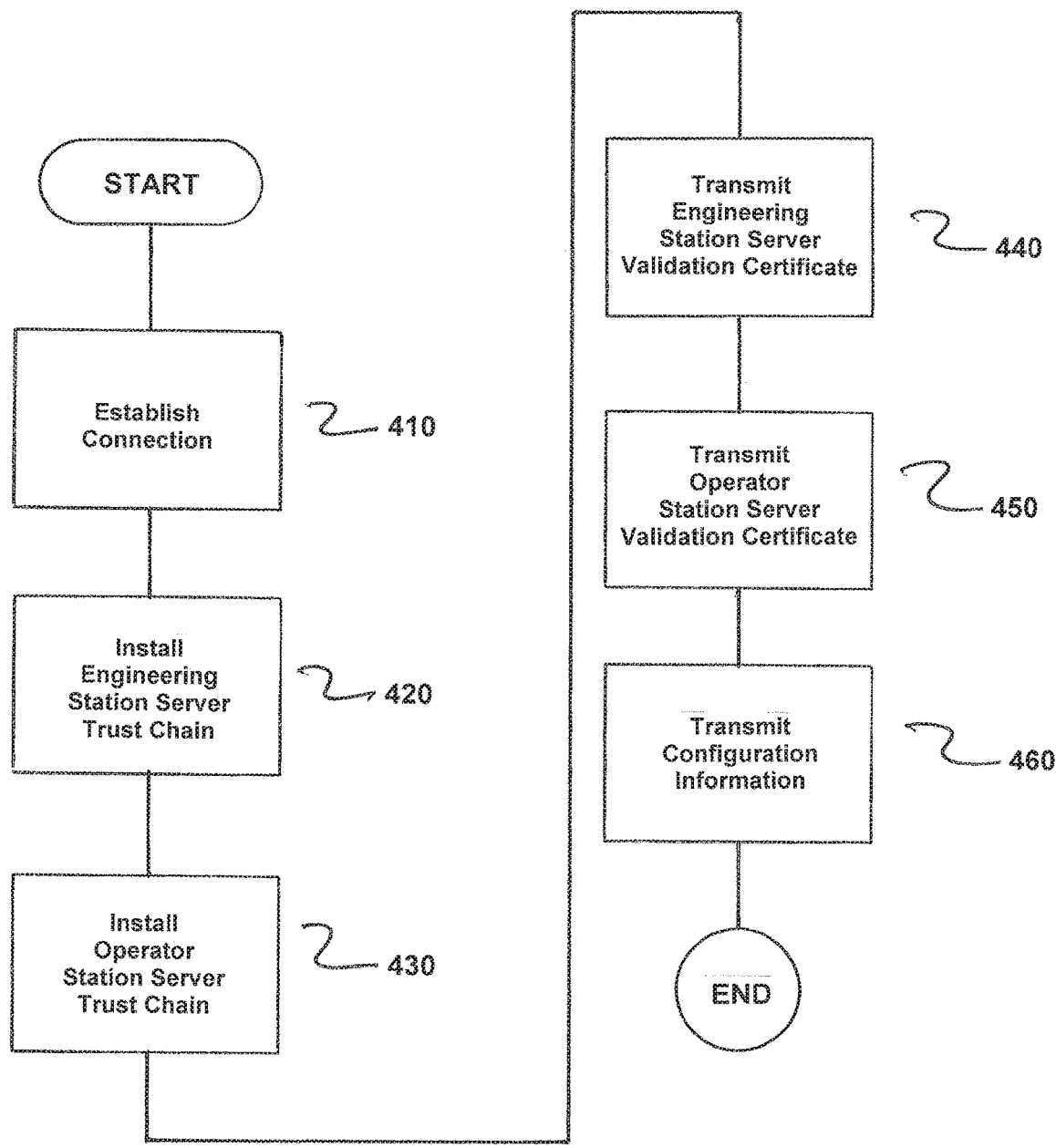
FIG. 4 is a flowchart of the method in accordance with the invention.

FIG. 4 is a flowchart of the method for initializing a server 15, 16 formed as an operator station server 15, 16 in a technical installation including at least one server 14 comprising an engineering station server 14 and at least one certification authority 20, 23 for issuing certificates. The method comprises establishing a connection from the engineering station server 14 to the operator station server 15, 16, as indicated in step 410. Next, a trust chain 5, 6 valid for the engineering station server 14 is installed on the operator station server 15, 16, as indicated in step 420.

Next, a trust chain 5, 6 valid for the operator station server 15, 16 is installed on the engineering station server 14, as indicated in step 430.

Next, a validation certificate of the engineering station server 14 is transmitted to the operator station server 15, 16 to permit validation of the engineering station server 14 by the operator station server 15, 16 via a previously installed corresponding trust chain 5, 6, as indicated in step 440. Next, the validation certificate of the operator station server 15, 16 is transmitted to the engineering station server 14 to permit validation of the operator station server 15, 16 by the engineering station server 14 via the previously installed corresponding trust chain 5, 6, as indicated in step 450.

Configuration information from the engineering station server 14 is now transmitted to a certification service 37, 38 implemented on the operator station server 15, 16, as indicated in step 460. In accordance with the method of the invention, the configuration information depending on a role of the operator station server 15, 16 in the technical installation and comprising information identifying which certificates of the certification service 37, 38 of the operator station server 15, 16 must be requested from the certification authority 20, 23 of the technical installation.

Although the invention has been illustrated and described in detail with the preferred exemplary embodiment, the invention is not restricted by the examples disclosed and other variations can be derived therefrom by a person skilled in the art without departing from the protective scope of the invention.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for initializing a server formed as an operator station server in a technical installation including at least one server comprising an engineering station server and at least one certification authority for issuing certificates, the method comprising:
   a) establishing a connection from the engineering station server to the operator station server;
   b) installing a trust chain valid for the engineering station server on the operator station server;
   c) installing a trust chain valid for the operator station server on the engineering station server;
   d) transmitting a validation certificate of the engineering station server to the operator station server to permit validation of the engineering station server by the operator station server via a previously installed corresponding trust chain;

e) transmitting the validation certificate of the operator station server to the engineering station server to permit validation of the operator station server by the engineering station server via the previously installed corresponding trust chain; and f) transmitting a configuration information from the engineering station server to a certification service implemented on the operator station server, the configuration information depending on a role of the operator station server in the technical installation and comprising information identifying which certificates of the certification service of the operator station server must be requested from the certification authority of the technical installation;

wherein the operator station server centrally captures data of an operator control and monitoring system, captures alarm and measured value archives of a control system of the technical installation, and provides said data and measured value archives to users;

wherein the engineering station server is configured to generate, administer, archive and document hardware and software projects for the control system of the technical installation;

wherein the configuration information further comprises information identifying which certificates the certification service of the operator station server must again remove from the operator station server; and wherein the configuration information transmitted to the certification service implemented on the operator station server is also transmitted by the engineering station server to the at least one registration service of the technical installation.

2. The method as claimed in claim 1, wherein at least one registration service of the technical installation is interposed between the certification service of the operator station server and the certification authority and, in place of the certification service of the operator station server, which requests required certificates from the certification authority of the technical installation.

3. The method as claimed in claim 2, wherein the configuration information transmitted from the engineering station server to a certification service implemented on the operator station server comprises information indicating from which registration service of the technical installation the certificates must be requested.

4. The method as claimed in claim 2, wherein the configuration information transmitted to the certification service implemented on the operator station server is also transmitted by the engineering station server to the at least one registration service of the technical installation.

5. The method as claimed in claim 4, wherein an additional operator station server establishes a connection to the at least one registration service such that the additional operator station server becomes integrated into the technical installation; wherein the registration service, requests the required certificates from the certification authority of the technical installation in place of a certification service of the additional operator station server.

6. The method as claimed in claim 1, wherein the technical installation is a production or process installation.

7. An operator station server of a technical installation upon which a certification service is implemented, wherein the operator station server is configured to:

a) connect to an engineering station, b) receive a trust chain valid for the engineering station server, c) transmit a trust chain valid for the operator station server for installation on the engineering station server, d) receive a validation certificate of the engineering station server to permit validation of the engineering station server via a previously installed corresponding trust chain, e) transmit the validation certificate to the engineering station server to permit validation of the operator station server by the engineering station server via the previously installed corresponding trust chain, and f) receive a configuration information into the certification service, which depends on a role of the operator station server in the technical installation, from at least one of (i) the engineering station server and (ii) a registration service of the technical installation;

wherein the operator station server centrally captures data of an operator control and monitoring system, captures alarm and measured value archives of a control system of the technical installation, and provides said data and measured value archives to users;

wherein the engineering station server is configured to generate, administer, archive and document hardware and software projects for the control system of the technical installation;

wherein the configuration information comprises information identifying which certificates of the certification service of the operator station server must be requested from a certification authority of the technical installation;

wherein the configuration information further comprises information identifying which certificates the certification service of the operator station server must again remove from the operator station server; and wherein the configuration information transmitted to the certification service implemented on the operator station server is also transmitted by the engineering station server to the at least one registration service of the technical installation.

8. A technical installation, comprising:
at least one engineering station server;
at least one operator station server; and
at least one certification authority, wherein the operator station server is configured as claimed in claim 7.

9. The technical installation of claim 8, wherein the technical installation is a production or process installation.

* * * * *